United States Patent Office 2,784,143
Patented Mar. 5, 1957

2,784,143

PREPARING CLINICAL DEXTRAN

Robert L. Wieman, Terre Haute, Ind., assignor to Commercial Solvents Corporation, Terre Haute, Ind., a corporation of Maryland No Drawing. Application November 15, 1952,
Serial No. 320,815

2 Claims. (Cl. 167—78)

My invention relates to clinical dextran and more particularly it relates to buffered clinical dextran and a process for preparing it.

Dextran is a bacterial polysaccharide material formed mainly by bacteria of the genus Leuconostoc as well as by some other microorganisms. Dextran is built up of glucose units condensed into long chains and generally has a very high molecular weight.

It was found in Sweden that dextran was quite useful as a blood volume extender or blood plasma substitute when the long chains of glucose units were assembled into molecules of an average molecular weight less than about 100,000. Clinical dextran is ordinarily obtained by hydrolysis of the high molecular weight material generally produced by bacteria of the genus Leuconostoc. Such a clinical material is the subject matter of U. S. Patent 2,437,518 by Gronwall and Ingelman issued March 9, 1948. The clinical dextran when used as a blood volume extender is generally employed in 6% aqueous solution since the viscosity is comparable to that of blood plasma and the osmotic activity is of the right magnitude.

In preparing the aqueous solution of clinical dextran, it has been the practice to autoclave the solution to insure sterility. When a 6% aqueous solution of clinical dextran is prepared it has a pH ranging from between about 6 to about 7 but upon autoclaving, the pH drops considerably to a value of about 3.0. Previous attempts to rectify this problem have included adjusting the pH of the 6% solution with sodium hydroxide to a value of about 9.0 to about 9.5 prior to autoclaving. In many cases however, this expedient is not entirely successful since the pH of the autoclaved material drops below the desired range to a value between about 4.5 and 5.5. When this occurred attempts were made to adjust the pH of the 6% solution to a value higher than 9.0 to 9.5 prior to autoclaving but it was found that adjusting the pH above this range prior to autoclaving resulted in only a very slight increase in the final pH. Even more serious, however, is the fact that when the pH is adjusted to a value above about 9.5 with sodium hydroxide prior to autoclaving, a brown color appears in the solution during autoclaving which cannot be removed by filtration, centrifugation, etc. of the autoclaved solution.

I have now discovered a new clinical dextran solution, and a method for preparing it which eliminates previous pH difficulties and also eliminates the development of color in the autoclaved clinical dextran solution. By my new process, I am able to provide a new clinical dextran solution which after sterilization, is essentially colorless as well as compatible with blood insofar as pH, salt content, etc. are concerned.

My new clinical dextran solution is an aqueous solution of clinical dextran which has been buffered with a mixed phosphate buffer prior to autoclaving which I have found maintains the pH of the aqueous dextran solution at substantially the same level through the autoclaving operation.

My new process consists essentially in preparing an aqueous solution of clinical dextran, deionizing the solution by passing same through a monobed ion exchange resin, filtering the solution thus obtained and buffering the latter by the addition of from 0.05 to 0.20 gm. of a mixture of disodium hydrogen phosphate and sodium dihydrogen phosphate per liter of dextran solution, the said phosphates being mixed in a weight ratio of 1:1, and finally autoclaving the solution to produce a sterile, essentially colorless clinical dextran solution suitable for use as a blood plasma substitute.

In connection with my new process, it is to be pointed out that the phosphate buffer with a weight ratio of 1 part disodium hydrogen phosphate to 1 part sodium dihydrogen phosphate buffers the dextran solution to a higher pH following autoclaving than other combinations of the same two materials even though mixtures of the two phosphates in different proportions have higher pH values than the 1:1 mixture. For example, a 1:1 ratio of disodium hydrogen phosphate to sodium dihydrogen phosphate has a pH in 6% aqueous solution of 6.17 while a 2:1 weight ratio of disodium hydrogen phosphate to sodium dihydrogen phosphate in 6% aqueous solution has a pH of 6.51, a 3:1 weight ratio has a pH of 6.72 and a 4:1 weight ratio has a pH of 6.88. Furthermore, when the various weight ratios of the phosphate buffers other than 1:1 are employed there is a definite increase in the amount of color produced during the autoclaving of the buffered solution.

The deionization step of my process is preferably conducted by passing the aqueous solution of dextran through a monobed ion exchange resin which is a mixture of a cation exchange resin and an anion exchange resin. It is obvious that the same result can be obtained by passing the aqueous solution through two ion exchange resins in different columns, one being a cation exchange resin and the other an anion exchange resin. Any suitable cation and anion exchange resins may be employed as long as they do not adversely affect the dextran itself or introduce extraneous ions into the solution which would render the solution unfit for infusion in human beings. I prefer to employ the monobed resin known as Amberlite MB-1 which is a mixture of Amberlite IR-120, a sulfonic acid-type cation exchange resin, and Amberlite IRA-400, a strong basic anion exchange resin, the Amberlites being products of the Rohm and Haas Corp., Philadelphia, Pennsylvania.

The amount of the mixed buffer which I can employ in my new process ranges from about 0.05 to about 0.20 gm. per liter of aqueous solution of dextran containing 6% dextran by weight. It is obvious that equivalent amounts of buffer are to be used with aqueous solutions of dextran containing amounts other than 6% by weight of dextran. I have found that with amounts greater than 0.30 gm. per liter of buffer, the final solution after autoclaving has some color which renders it substantially unsatisfactory. However, the amount of buffer which can be used is limited by the amount of phosphate normally in the blood serum and in the blood cells. The normal amount of phosphate in the blood serum is about 10 mg. per 100 ml. of blood serum and about 18 mg. per 100 ml. in the cells. I have found that upon administration of dextran containing phosphates, about 70% of the phosphate is found in the blood system when analyses are made. The maximum amount of phosphate which I employ in my process therefore, coincides with approximately the maximum amount which can be administered without raising the phosphate concentration of the blood serum above that normally present. Amounts of phosphate below the lower limit of 0.05 gm. per liter result in a lower pH of the autoclaved solution and an increase in the amount of color produced.

The following examples are offered to illustrate my invention but I do not intend to be limited to the specific amounts, procedures, and materials disclosed therein.

*Example I*

A 3 liter portion of a 6% aqueous solution of clinical dextran was prepared and the pH determined to be 5.91. The solution was deionized by passing it through a column containing a monobed ion exchange resin which was a mixture of a sulfonic acid cation-type exchange resin and a strong basic anion exchange resin, the particular resin employed being Amberlite MB–1. Following deionization the pH of the solution was determined to be 4.00. The solution was then filtered through a biological filter, and, following filtration, divided into three 1-liter portions. To each of the three 1-liter portions, 0.18 gm., 0.12 gm. and 0.06 gm. of a 1:1 weight ratio mixture of disodium hydrogen phosphate and sodium dihydrogen phosphate was added, respectively. The pH of the three portions was then determined to be 6.96, 6.96, and 7.01 respectively. Each of the three 1-liter portions was then autoclaved for 20 minutes at 15 pounds pressure and following autoclaving the pH again determined to be 6.88, 6.97, and 6.91 respectively. The original color of the 3 liters of 6% aqueous solution of dextran was 15 by the APHA color standard. The method of determining color by this standard is described in Standard Methods for the Examination of Water and Sewage, 9th edition (1946), published by the American Public Health Association at pages 14 and 15. The final color by the APHA standard of the 3 buffered portions following autoclaving was 10, 10, and 5 respectively.

The following example shows the results of experiments conducted according to previously used methods for preparing sterile aqueous solutions of dextran suitable for use as blood volume extenders.

*Example II*

Three 1-liter portions of a 6% aqueous solution of dextran having a pH of 6.0, 6.0, and 6.2 respectively were adjusted to a pH of 9.0, 9.8, and 10.2 respectively with 10% sodium hydroxide, filtered through a biological filter, and then autoclaved for 20 minutes at 15 pounds pressure. The final pH of the materials following autoclaving was 4.9, 5.3, and 5.9 respectively. The final color of the three 1-liter portions according to the APHA standard was 30, 30, and 40 respectively.

It can be seen from a consideration of the above two examples that the dextran solution prepared according to my new process has a final pH within the desirable 6.5 to 7.5 range while that prepared according to the previously known method had a pH considerably below the desirable range. This was the case even though the pH of the solutions after buffering but before autoclaving was considerably lower when my new method was employed than when the previously known methods were used. Furthermore, the final dextran solution produced according to my new method was essentially water-white while the final dextran solutions prepared according to previously known methods developed a color ranging from yellow towards brown.

Now having described my invention, what I claim is:

1. In the preparation of aqueous solutions of dextran suitable for use as infusion fluids, the process which consists essentially in adding to an aqueous solution of a deionized clinical dextran, having a concentration of about 6% by weight of dextran, from about 0.05 to 0.20 grams per liter of a mixture containing equal amounts by weight of disodium hydrogen phosphate and sodium dihydrogen phosphate sufficient to buffer the solution at a pH of from about 6.5 to 7.5, and heat-sterilizing the buffered dextran solution, whereby the pH remains substantially constant during the sterilization step and a substantially colorless sterilized solution of clinical dextran is obtained.

2. In the preparation of aqueous solutions of dextran suitable for use as infusion fluids, the process which consists essentially in preparing a 6% by weight aqueous solution of clinical dextran, passing the solution through a monobed ion-exchange resin, adding from about 0.05 to 0.20 g. per liter of a mixture of disodium hydrogen phosphate and monosodium dihydrogen phosphate to produce a pH of from about 6.5 to 7.5; the said phosphates in said mixture having a weight ratio of 1:1; and heat sterilizing the resulting solution, whereby the pH remains substantially constant and a substantially colorless solution of clinical dextran is obtained.

References Cited in the file of this patent

UNITED STATES PATENTS

| | | |
|---|---|---|
| 2,437,518 | Gronwall | Mar. 9, 1948 |
| 2,634,259 | Ney et al. | Apr. 7, 1953 |
| 2,685,579 | Wimmer | Aug. 3, 1954 |

OTHER REFERENCES

Hartman et al.: Annals of Surgery, August 1941, pp. 212–214.

Hartman et al.: J. A. M. A., Apr. 24, 1943, pp. 1337 and 1338.

Scientific American, January 1945, p. 37.

Reid: American Journal Clin. Path., vol. 119, pp. 10 to 11, January, 1949.

Reid: Ind. and Eng. Chem., vol. 43, pp. 1074–75, May 1951.